May 6, 1924.

H. D. HILDEBRAND

VALVE

Filed Feb. 27, 1922

1,492,599

2 Sheets-Sheet 1

WITNESSES
J. Herbert Bradley

INVENTOR
Harry D. Hildebrand
by Darwin S. Wolcott
atty

May 6, 1924.

H. D. HILDEBRAND

VALVE

Filed Feb. 27, 1922 2 Sheets-Sheet 2

1,492,599

INVENTOR
Harry D. Hildebrand
by Darwin S. Wolcott
Atty

Patented May 6, 1924.

1,492,599

UNITED STATES PATENT OFFICE.

HARRY D. HILDEBRAND, OF MOUNT VERNON, OHIO; ZAIDEE S. HILDEBRAND ADMINISTRATRIX OF SAID HARRY D. HILDEBRAND, DECEASED.

VALVE.

Application filed February 27, 1922. Serial No. 539,439.

*To all whom it may concern:*

Be it known that I, HARRY D. HILDEBRAND, residing at Mount Vernon, in the county of Knox and State of Ohio, a citizen of the United States, have invented or discovered certain new and useful Improvements in Valves, of which improvements the following is a specification.

In Letters Patent No. 1,229,456, granted June 12, 1917, is described and shown a construction of valve mechanism having in combination oppositely disposed valve seats having ports therethrough and valves consisting of resilient metal strips which were so supported by abutments in operative relation to the ports that the strips could be bent or flexed by the pressure of fluid to permit of escape of fluid through the ports. In one of the constructions shown in said patent, the supporting abutments were arranged adjacent to the ends of the strip and the opening flexure of the spring was intermediate such abutments. In another form the supporting abutment is arranged to bear against the strips at points approximately midway their lengths so that the opening of the valve is due to the flexure of the strip on opposite sides of the abutments.

The invention described and claimed herein has for its object a construction of valve mechanism, in which the valves are maintained in normal or closed position by a suitably constructed and arranged resilient means, and the opening of the port is effected by substantially equal movement of the strip for its entire length against such pressure or the primary or initial opening or by such equal movement and the opening completed by the flexure of the valve strip and a further flexure of the spring. The invention is hereinafter more fully described and claimed.

Figure 1:
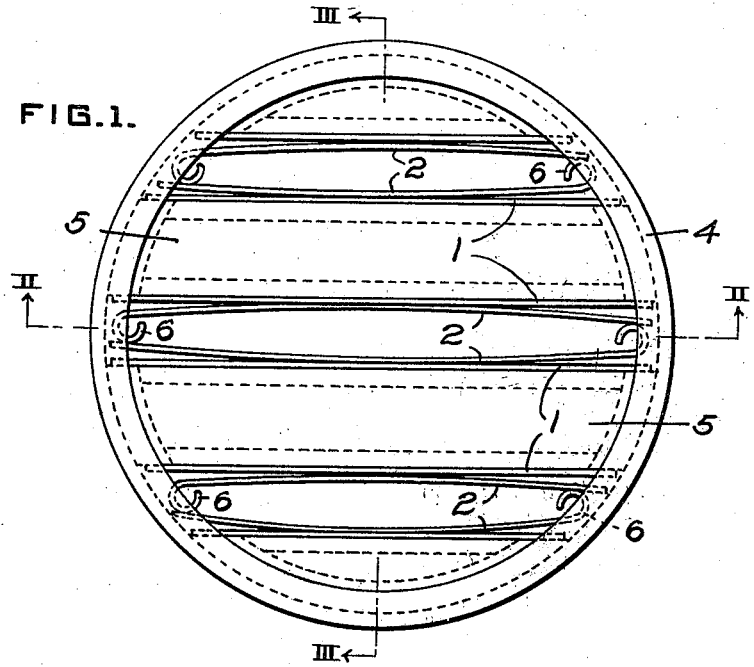
Figure 2:
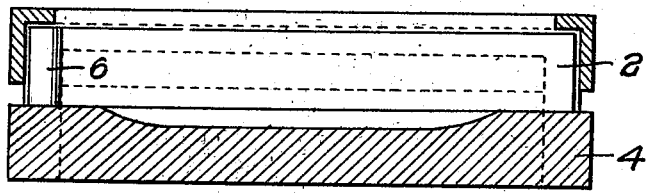
Figure 3:
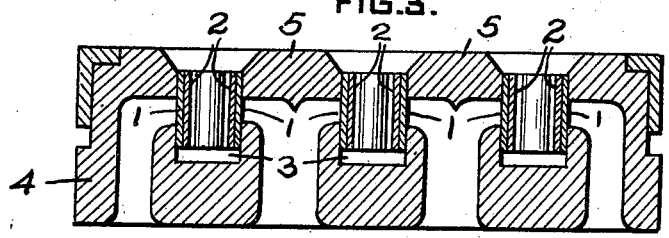

In the accompanying drawings forming a part of this specification, Fig. 1 is a top plan view showing the improvement embodied in a valve mechanism for an air or gas compressor; Fig. 2 and Fig. 3 are sectional views on planes indicated respectively by the lines II—II and III—III, Fig. 1; Figs. 4, 5, 6 and 7, 8 and 9, are diagrammatic views of different arrangements and constructions of springs.

In the practice of the invention, the metal strips 1 and their controlling spring or springs 2 are arranged in grooves 3 in the block 4 which may be of any peripheral contour, and the grooves may be parallel as shown herein or radial as shown in the patent herein before mentioned. The ribs 5 intermediate of the grooves are made hollow for the flow of gas, air or other flows to the ports 6 formed in the side walls of the ribs as shown in Fig. 3.

The valves consist of metal strips which are yieldingly held on their respective seats by means of springs 2. In the construction shown in Figs. 1, 2, and 3, each spring has one end curled over as at 6 and the portion intermediate the ends slightly bowed, and the springs forming a pair are placed together so that the straight end of one spring will bear on the curl 6 of the other spring. When so arranged and placed between adjoining valves, the convex surfaces of the springs will bear against the valves at about the middle of the latter. The strips of metal forming the valves may be made of such rigidity relative to the resilience of the body portion of the springs that the initial opening movement of the valve will be due to the yielding of the spring. In the construction shown in Figs. 1, 2, and 3, such initial movement of the valve will cause a flattening of the bowed portions of the springs and the valves will bear for approximately their entire length on the springs, and the movement of the ends of the valves will be resisted by the curled portions 6 of the springs. The valves are made of such resistance that when they encounter the added resistance of the curls 6, there will be a flexure of the portions of the valves intermediate the ends.

Figure 4:
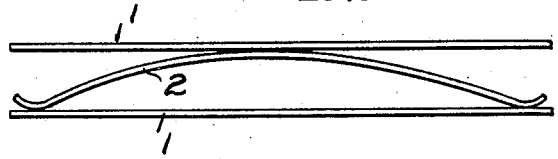

As shown in Fig. 4 a single bowed spring $2^a$ may be employed, the ends of said spring bearing against one valve near its ends, while the middle portion of the spring bears against the other valve.

In lieu of a single spring as shown in Figs. 1, 2, and 3, two springs may be interposed between the valve strips as shown in Figs. 4, 5, 6, 7 and 8.

Figure 5:
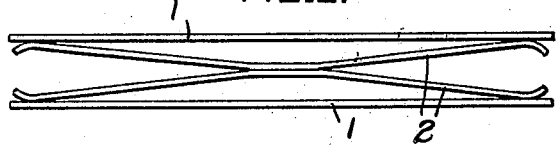
Figure 6:
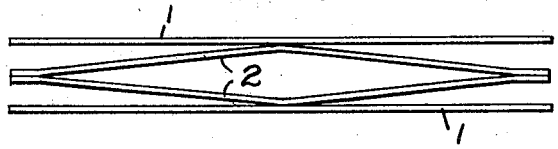
Figure 7:
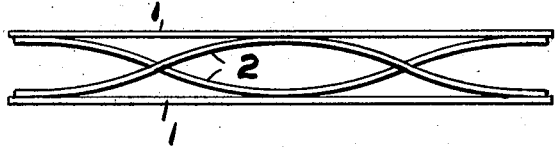

In the construction shown in Fig. 5 the springs are arranged to bear at their ends in the strips and against one another at a point intermediate the ends while Fig. 6 shows a reversed arrangement of the springs, the springs being in contact with the valve at points intermediate their ends, while the latter are in contact. In the construction shown in Fig. 7, two springs are employed, each bearing at their ends on one strip or valve, and at an intermediate point on the opposite strip or valve.

Figure 8:
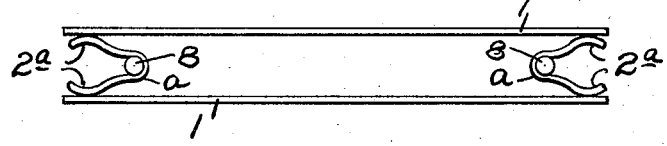

In lieu of elliptical springs other shapes or constructions of springs may be employed without departing from the spirit of the invention described and claimed herein. As for example, two substantially U-shaped springs as 2ª may be so arranged intermediate the valves that their ends will bear on the respective valves, as shown in Fig. 8. In order to prevent the springs 2ᵇ being tipped from operative positions, they are formed with eyes a engaging pins 8 projecting from the bottoms of the grooves 3.

Figure 9:
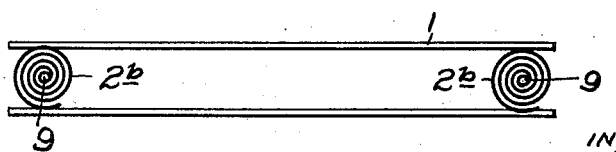

As shown in Fig. 9, spiral springs 2ᵇ may be employed. The eyes of the spiral are slipped onto pins 9 in the bottoms of the grooves 3, while the outer members or coils of the spiral have diametrically opposite points in contact with the respective valve strips.

It is characteristic of the construction shown herein that the resilient means interposed between the valves is operative on both valves. This characteristic is found in the form shown in Fig. 5 and Fig. 6, for although neither spring is in direct engagement with both valves, the springs have their ends or points intermediate the ends in contact with each other so that each valve is controlled by both springs.

I claim herein as my invention:

1. A valve mechanism for pumps having in combination oppositely disposed valve seats, flat strips of suitable material for closing said ports and means adapted to exert a resilient pressure against portions of the valves to hold them on their seats and a substantially higher pressure on other portions of the valves after the initial opening movement of the valves.

2. A valve mechanism for pumps having in combination oppositely disposed valve seats, valves formed of flat strips of suitable material for closing said ports and means for exerting resilient pressure against intermediate portions of the valves to hold them in closed positions and a higher pressure against the end portions of the valves after the initial opening movement of the valves.

3. A valve mechanism for pumps having in combination oppositely disposed valve seats, valves formed of flat strips of resilient material, and resilient means interposed between the valves, said means consisting of resilient strips bowed longitudinally and having one end curled inwardly, said strips being oppositely disposed.

In testimony whereof I have hereunto set my hand.

HARRY D. HILDEBRAND.